US 12,487,195 B2

United States Patent
Shiramata et al.

(10) Patent No.: US 12,487,195 B2
(45) Date of Patent: Dec. 2, 2025

(54) DETECTOR STAND AND X-RAY DIFFRACTION APPARATUS

(71) Applicant: RIGAKU CORPORATION, Tokyo (JP)

(72) Inventors: Yuji Shiramata, Tokyo (JP); Atsushi Kuji, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 215 days.

(21) Appl. No.: 18/407,503

(22) Filed: Jan. 9, 2024

(65) Prior Publication Data
US 2024/0255446 A1    Aug. 1, 2024

(30) Foreign Application Priority Data
Jan. 31, 2023   (JP) ................ 2023-012826

(51) Int. Cl.
*G01N 23/20008*   (2018.01)
*G01N 23/207*   (2018.01)

(52) U.S. Cl.
CPC ..... *G01N 23/20008* (2013.01); *G01N 23/207* (2013.01); *G01N 2223/056* (2013.01); *G01N 2223/1016* (2013.01); *G01N 2223/321* (2013.01); *G01N 2223/501* (2013.01)

(58) Field of Classification Search
None
See application file for complete search history.

(56) References Cited

U.S. PATENT DOCUMENTS

| | | | | |
|---|---|---|---|---|
| 4,972,448 A * | 11/1990 | Munekawa | .......... | G01N 23/207 378/81 |
| 5,949,847 A * | 9/1999 | Terada | ................. | G01N 23/221 378/90 |
| 6,744,850 B2 * | 6/2004 | Fanton | ................... | G01N 23/20 378/70 |
| 6,895,075 B2 * | 5/2005 | Yokhin | .................. | G01N 23/20 378/90 |
| 7,190,762 B2 * | 3/2007 | He | ........................ | G01N 23/207 378/70 |
| 7,551,719 B2 * | 6/2009 | Yokhin | ............ | G01N 23/20008 378/90 |
| 7,731,424 B2 * | 6/2010 | Hornig | ................. | G03B 42/025 378/204 |

(Continued)

OTHER PUBLICATIONS

Yuji Shiramata, "Micro-area X-ray diffraction measurement by SmartLab μHR diffractometer system with ultra-high brilliance microfocus X-ray optics and two-dimensional detector HyPix-3000", Rigaku Journal, Winter 2016, vol. 32, No. 1, 2016, pp. 3-9.

*Primary Examiner* — Thomas R Artman
(74) *Attorney, Agent, or Firm* — XSENSUS LLP

(57) ABSTRACT

A detector stand for an X-ray detector is provided. A first arrangement portion arranges the X-ray detector in first orientation. A second arrangement portion arranges the X-ray detector in second orientation. The X-ray detector can be fixed to a mounting portion. In the detector stand, the X-ray detector is selectively mountable on the first arrangement portion or the second arrangement portion through the mounting portion. An arrangement angle of the X-ray detector fixed to the mounting portion is different between the first orientation and the second orientation.

13 Claims, 10 Drawing Sheets

(56) References Cited

U.S. PATENT DOCUMENTS

| | | | |
|---|---|---|---|
| 7,920,676 B2* | 4/2011 | Yun | G01N 23/201 378/70 |
| 8,675,816 B2* | 3/2014 | Turyansky | G01N 23/2076 378/85 |
| 9,557,282 B1* | 1/2017 | Shu | G01N 23/20016 |
| 10,295,484 B2* | 5/2019 | He | G01N 23/207 |
| 10,712,294 B2* | 7/2020 | Doi | G01N 23/20025 |
| 10,794,844 B2* | 10/2020 | Vukotic | G01N 23/20025 |
| 10,876,978 B2* | 12/2020 | Ogata | G01N 23/20025 |
| 10,948,436 B2* | 3/2021 | Kato | G01N 23/223 |
| 11,346,794 B2* | 5/2022 | Vukotic | G01N 23/207 |
| 11,867,595 B2* | 1/2024 | Liu | G01B 15/08 |
| 12,336,851 B2* | 6/2025 | Lazarev | A61B 6/4233 |
| 2002/0097837 A1* | 7/2002 | Fanton | G01N 23/20 378/70 |
| 2004/0156474 A1* | 8/2004 | Yokhin | G01N 23/20 378/70 |
| 2005/0105684 A1* | 5/2005 | Bruegemann | G01N 23/207 378/71 |
| 2006/0062351 A1* | 3/2006 | Yokhin | G01N 23/20008 378/86 |
| 2006/0093090 A1* | 5/2006 | He | G01N 23/207 378/70 |
| 2008/0273662 A1* | 11/2008 | Yun | G03F 7/70625 378/74 |
| 2009/0092230 A1* | 4/2009 | Hornig | G03B 42/025 378/189 |
| 2011/0188631 A1* | 8/2011 | Turyansky | G01N 23/2076 378/82 |
| 2014/0119512 A1* | 5/2014 | Matsushita | G01T 1/16 378/81 |
| 2018/0292334 A1* | 10/2018 | He | G01N 23/207 |
| 2018/0356354 A1* | 12/2018 | Doi | G01N 23/201 |
| 2019/0178823 A1* | 6/2019 | Vukotic | G01N 23/207 |
| 2019/0227005 A1* | 7/2019 | Ogata | G21K 5/02 |
| 2019/0227008 A1* | 7/2019 | Kato | G01N 23/223 |
| 2021/0055236 A1* | 2/2021 | Vukotic | G01N 23/207 |
| 2022/0120561 A1* | 4/2022 | Liu | G01N 23/20 |
| 2023/0341340 A1* | 10/2023 | Lazarev | G01N 23/223 |
| 2024/0255446 A1* | 8/2024 | Shiramata | G01N 23/20008 |

* cited by examiner

β DIRECTION

2θ DIRECTION

DETECTOR STAND AND X-RAY DIFFRACTION APPARATUS

CROSS-REFERENCE TO RELATED APPLICATION

This patent application is based on and claims priority to Japanese Patent Application No. 2023-012826, filed on Jan. 31, 2023 in the Japan Patent Office, the entire disclosure of which is incorporated by reference herein.

BACKGROUND OF THE INVENTION

Field of the Invention

The present invention relates to a detector stand and an X-ray diffractometer.

Description of the Related Art

As an X-ray detector, a two-dimensional detector in which an aspect ratio of a detection range is not 1 is known (for example, Rigaku Journal, Winter 2016, Volume 32, No. 1, 2016, pp. 3-9). Such a detector can acquire profiles of different ranges depending on arrangement of the detector. For example, in a case where the detector is arranged such that a detection surface is laterally long, the detector can measure a range relatively wide in an in-plane direction ($\beta$ direction). In contrast, in a case where the detector is arranged such that the detection surface is vertically long, the detector can measure a range relatively wide in an out-plane direction ($2\theta$ direction).

SUMMARY OF THE INVENTION

According to an embodiment of the present invention, there is provided a detector stand for an X-ray detector, comprising: a first arrangement portion configured to arrange the X-ray detector in first orientation: a second arrangement portion configured to arrange the X-ray detector in second orientation: and a mounting portion to which the X-ray detector can be fixed, wherein in the detector stand, the X-ray detector is selectively mountable on the first arrangement portion or the second arrangement portion through the mounting portion, and an arrangement angle of the X-ray detector fixed to the mounting portion is different between the first orientation and the second orientation.

According to another embodiment of the present invention, there is provided an X-ray diffractometers, comprising: an X-ray detector: and the detector stand above.

DETAILED DESCRIPTION OF THE PREFERRED EMBODIMENTS

In measurement by the detector as described above, a user or the like mounts the detector on a goniometer by using a stand in some cases. In a case where the detector is mounted on the goniometer by using different stands corresponding to respective arrangements, it is necessary to mount the detector on a corresponding one of the different stands every time the arrangement is changed over, and it takes time to change over the arrangement.

An embodiment provides a technique for easily changing arrangement of a two-dimensional detector as compared with the existing technique.

<Outline of Detector Stand>

Figure 1:
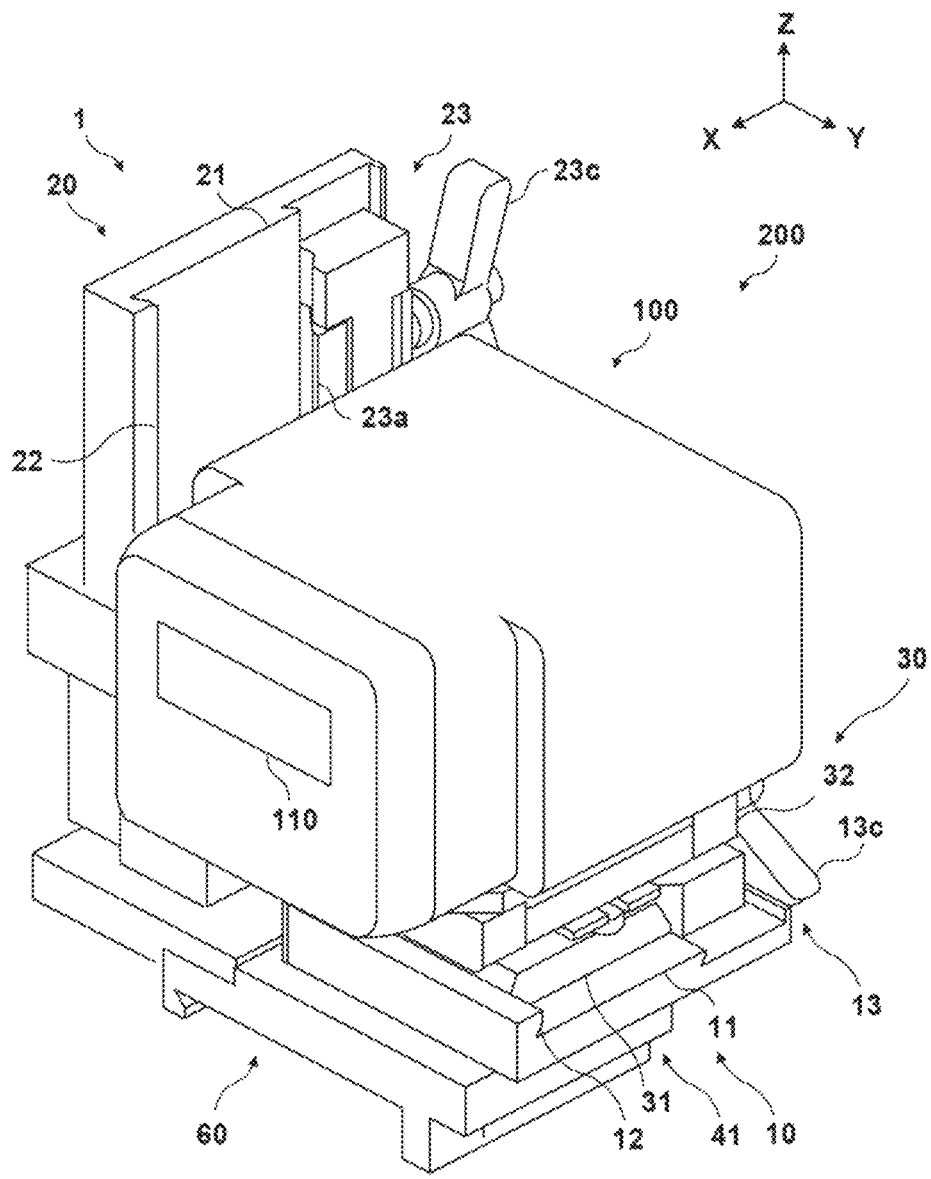
FIG. 1 is a perspective view illustrating an outline of an X-ray diffractometers according to an embodiment.

FIG. 1 is a perspective view illustrating an outline of a detector stand 1. FIG. 1 illustrates a state where an X-ray detector 100 is installed on the detector stand 1. The X-ray detector 100 is a pixel detector that can perform two-dimensional measurement. In the present embodiment, the X-ray detector 100 is a detector in which an aspect ratio (in this example, indicating ratio of lateral length to longitudinal length) of a detection region is not 1. In other words, the X-ray detector 100 includes a detection surface 110 defining the detection region where an X-ray is detected. The detection surface 110 has a rectangular shape in which the longitudinal length and the lateral length are different from each other. The aspect ratio of the detection region may be, for example, 1.1 or more, 1.2 or more, 1.5 or more, 2 or more, 3 or more, 4 or more, or 5 or more. The X-ray detector 100 may be able to perform zero-dimensional or one-dimensional measurement.

Figure 2:
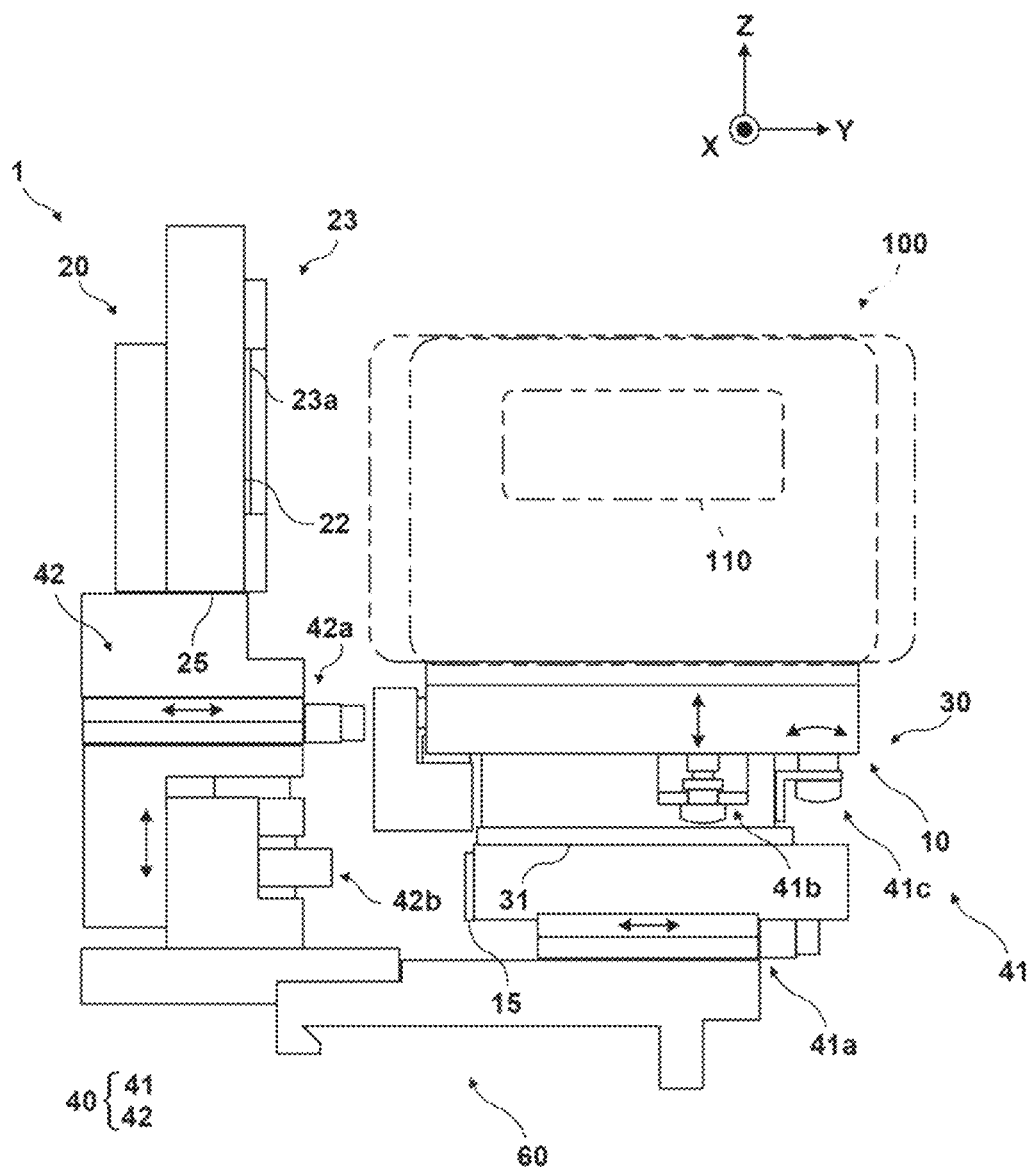
FIG. 2 is a front view of a detector stand according to the embodiment.
Figure 3:
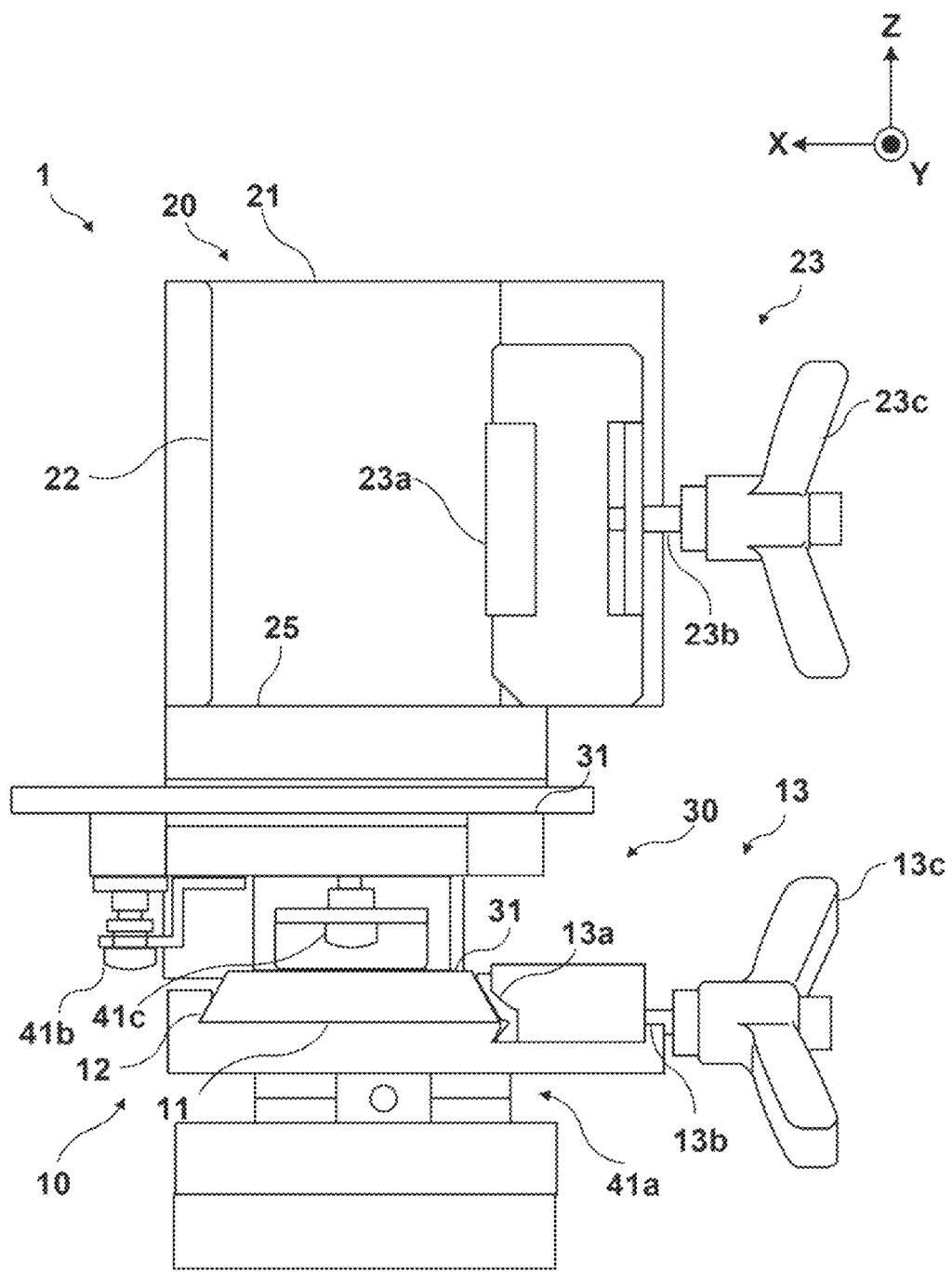
FIG. 3 is a side view of the detector stand according to the embodiment.
Figure 4:
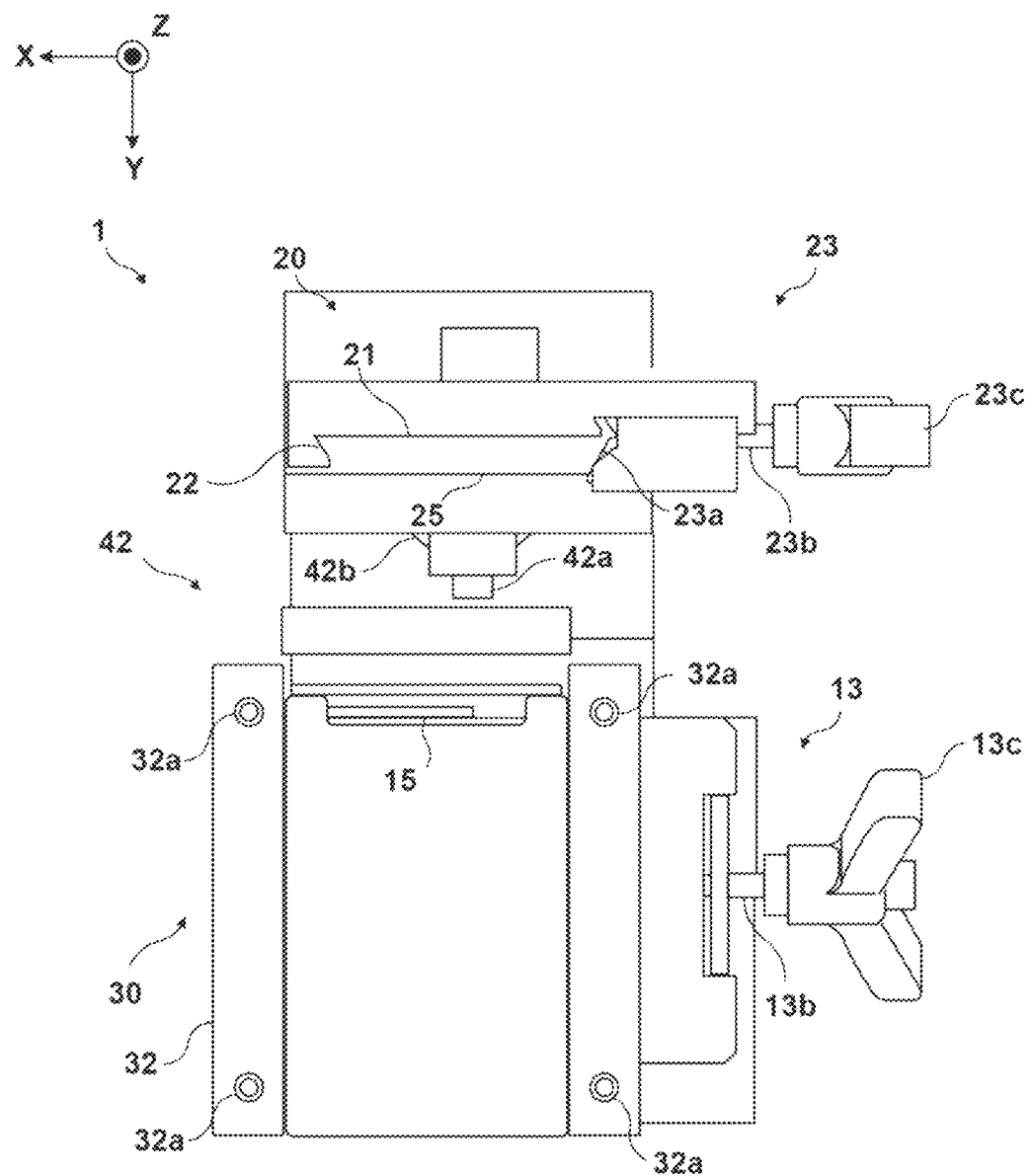
FIG. 4 is a plan view of the detector stand according to the embodiment.

FIG. 2 is a front view of the detector stand 1, FIG. 3 is a side view of the detector stand 1, and FIG. 4 is a plan view of the detector stand 1.

The detector stand 1 supports the X-ray detector 100. The detector stand 1 includes a landscape arrangement portion 10, a portrait arrangement portion 20, a mounting portion 30, and an adjustment portion 40. These portions are described below. The detector stand 1 further includes a coupling portion 60 to be coupled to the goniometer to enable adjustment of a distance between the X-ray detector 100 and a detection object.

<Stand Portion>

Next, two arrangement portions (landscape arrangement portion 10 and portrait arrangement portion 20) provided on the detector stand 1 are described.

The landscape arrangement portion 10 supports the X-ray detector 100 in landscape orientation. More specifically, when the mounting portion 30 to which the X-ray detector 100 has been fixed is mounted on the landscape arrangement portion 10, the landscape arrangement portion 10 supports the X-ray detector 100 in the landscape orientation. In the following, arrangement in which the mounting portion 30 is mounted on the landscape arrangement portion 10, namely, arrangement in which the X-ray detector 100 is supported by the landscape arrangement portion 10 through the mounting portion 30 is referred to as landscape orientation. In the landscape orientation, a width direction of the X-ray detector 100 extends in a lateral direction (horizontal direction). In the present embodiment, the width direction of the X-ray detector 100 corresponds to a long-side direction of the detection surface 110. The landscape arrangement portion 10 includes an arrangement surface 11, an XZ-direction regulation portion 12, a holding portion 13, and a Y-direction regulation portion 15.

The mounting portion 30 is disposed on the arrangement surface 11. In the present embodiment, the arrangement surface 11 is a surface extending on a horizontal plane (XY plane). The arrangement surface 11 may not be a plane surface. The XZ-direction regulation portion 12 regulates relative positions of the mounting portion 30 and the landscape arrangement portion 10. In this example, the XZ-direction regulation portion 12 regulates the relative positions of the mounting portion 30 and the landscape arrangement portion 10 in an X direction and a Z direction. The XZ-direction regulation portion 12 is a wall portion extending at least upward from the arrangement surface 11. The Y-direction regulation portion 15 regulates relative positions of the mounting portion 30 and the landscape arrangement portion 10 in a Y direction. In the present embodiment, the Y-direction regulation portion 15 is a plate-like member disposed so as to abut on a mounting member 31 when the mounting portion 30 is disposed on the landscape arrangement portion 10. However, the shape and the like of the Y-direction regulation portion 15 can be appropriately changed. Note that, in this example, the XZ-direction regulation portion 12 as the wall portion regulates the relative positions of the mounting portion 30 and the landscape arrangement portion 10 in the X direction and the Z direction: however, regulation of the relative positions in the X direction and regulation of the relative positions in the Z direction may be performed by different members. Alternatively, the XZ-direction regulation portion 12 and the Y-diction regulation portion 15 may be configured by the same member, or regulation of the relative positions in one of the X direction and the Z direction and regulation of the relative positions in the Y direction may be performed by the same member.

The holding portion 13 holds a position of the mounting portion 30 in a state where the relative positions of the mounting portion 30 and the landscape arrangement portion 10 are regulated by the XZ-direction regulation portion 12. The holding portion 13 includes an abutting portion 13a, a moving mechanism 13b, and a handle 13c. The abutting portion 13a abuts on the mounting portion 30. The moving mechanism 13b retractably moves the abutting portion 13a to the mounting portion 30. The handle 13c is to operate the moving mechanism 13b. Providing the handle 13c enables the user to change over arrangement of the X-ray detector 100 without a tool. In the present embodiment, the mounting portion 30 is mounted in a space defined by the arrangement surface 11, the XZ-direction regulation portion 12, and the abutting portion 13a.

The portrait arrangement portion 20 supports the X-ray detector 100 in portrait orientation. More specifically, when the mounting portion 30 to which the X-ray detector 100 has been fixed is mounted on the portrait arrangement portion 20, the portrait arrangement portion 20 supports the X-ray detector 100 in the portrait orientation. In the following, arrangement in which the mounting portion 30 is mounted on the portrait arrangement portion 20, namely, arrangement in which the X-ray detector 100 is supported by the portrait arrangement portion 20 through the mounting portion 30 is referred to as portrait orientation. In the portrait orientation, the width direction of the X-ray detector 100 extends in a longitudinal direction (vertical direction). The portrait arrangement portion 20 may include a structure similar to the structure of the landscape arrangement portion 10. In other words, an arrangement surface 21, an XY-direction regulation portion 22, and a holding portion 23 may have structures similar to the structures of the arrangement surface 11, the XZ-direction regulation portion 12, and the holding portion 13, respectively. In the present embodiment, the XZ-direction regulation portion 12 and the XY-direction regulation portion 22 have a similar structure: however, the regulation direction of the relative position with the mounting portion 30 is different between the XZ-direction regulation portion 12 and the XY-direction regulation portion 22 because of a difference of an arrangement angle. Further, an abutting portion 23a, a moving mechanism 23b, and a handle 23c that are components of the holding portion 23 may also have structures similar to the structures of the abutting portion 13a, the moving mechanism 13b, and the handle 13c that are components of the holding portion 13. Accordingly, description of the components of the portrait arrangement portion 20 is omitted.

In the present embodiment, the portrait arrangement portion 20 includes a Z-direction regulation portion 25 as a component corresponding to the Y-direction regulation portion 15 of the landscape arrangement portion 10. In the portrait arrangement portion 20, the XY-direction regulation portion 22 regulates relative positions of the mounting portion 30 and the portrait arrangement portion 20 in the X direction and the Y direction, and the Z-direction regulation portion 25 regulates the positions of the mounting portion 30 and the portrait arrangement portion 20 in the Z direction. The Z-direction regulation portion 25 is a block-like member provided on a lower side of the arrangement surface 21. The shape and the like of the Z-direction regulation portion 25 can be appropriately changed.

<Mounting Portion>

The X-ray detector 100 can be fixed to the mounting portion 30. In the detector stand 1, the X-ray detector 100 is selectively mountable on the landscape arrangement portion 10 or the portrait arrangement portion 20 through the mounting portion 30. The mounting portion 30 includes the mounting member 31 detachably mounted on the landscape arrangement portion 10 and the portrait arrangement portion 20, and a fixing portion 32 to which the X-ray detector 100 is fixed.

The mounting member 31 is a member slidable to each of the landscape arrangement portion 10 and the portrait arrangement portion 20. For example, the mounting member 31 has a shape complementary to a space formed in each of the landscape arrangement portion 10 and the portrait arrangement portion 20. Accordingly, the mounting member 31 is movable in the Y direction, but movement of the mounting member 31 in the ZX direction is regulated, relative to the landscape arrangement portion 10. Furthermore, the mounting member 31 is movable in the Z direction, but movement of the mounting member 31 in the XY direction is regulated, relative to the portrait arrangement portion 20.

For example, the fixing portion 32 includes a plurality of bolt holes 32a provided at positions corresponding to positions of a plurality of bolt holes (not illustrated) provided on a bottom surface of the X-ray detector 100. The fixing portion 32 can fix the X-ray detector 100 to the mounting member 31 through bolt fastening.

Figure 5A:
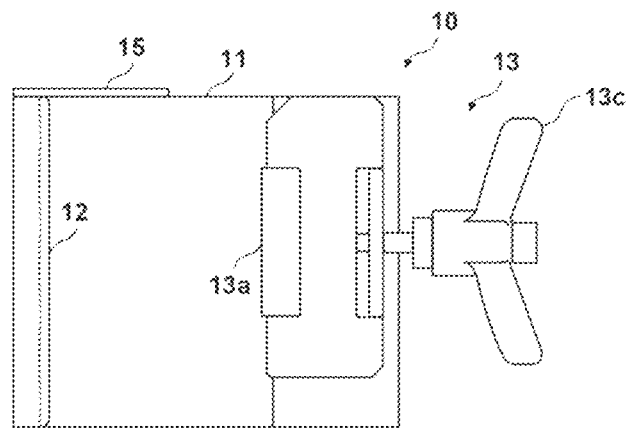
FIG. 5A is an explanatory diagram illustrating mounting operation of a mounting portion.
Figure 5B:
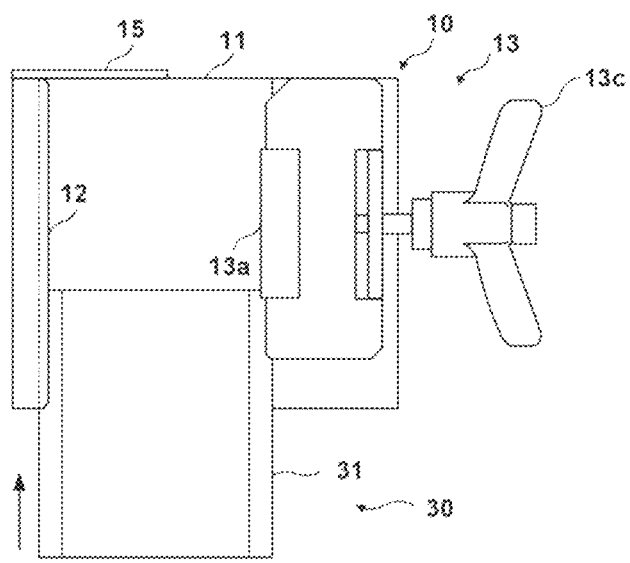
FIG. 5B is an explanatory diagram illustrating the mounting operation of the mounting portion.
Figure 5C:
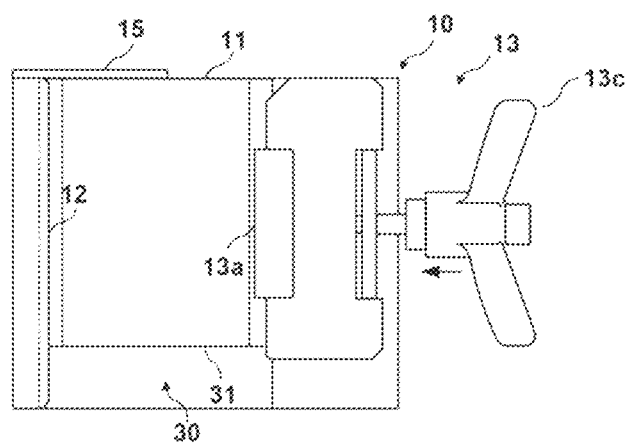
FIG. 5C is an explanatory diagram illustrating the mounting operation of the mounting portion.

FIG. 5A to FIG. 5C are explanatory diagrams illustrating mounting operation of the mounting portion 30. In this example, a case where the mounting portion 30 is mounted on the landscape arrangement portion 10 is described: however, the mounting portion 30 is mounted on the portrait arrangement portion 20 in a similar manner. Accordingly, description about the portrait arrangement portion 20 is omitted. In addition, illustration of some components is omitted for facilitating visualization.

FIG. 5A illustrates a state of the landscape arrangement portion 10 before the mounting portion 30 is mounted. FIG. 5B illustrates a state in the middle of mounting the mounting portion 30 on the landscape arrangement portion 10. At this time, the mounting portion 30 slides in a -Y direction relative to the landscape arrangement portion 10. FIG. 5C illustrates a state where the mounting portion 30 is mounted and is then held by the holding portion 13. The user operates the handle 13c to cause the abutting portion 13a to abut on the mounting portion 30. As a result, the mounting portion 30 is fixed to the landscape arrangement portion 10.

Further, at this time, the position of the mounting portion 30 in the X direction and the Z direction is regulated by abutment with the XZ-direction regulation portion 12 (see FIG. 3). Further, the position of the mounting portion 30 in the Y direction is regulated by abutment with the Y-direction regulation portion 15. Accordingly, for example, even in a case where the mounting portion 30 is mounted on the portrait arrangement portion 20 from the landscape arrangement portion 10, and is then mounted on the landscape arrangement portion 10 again, the position of the mounting portion 30 is reproduced with high accuracy by the XZ-direction regulation portion 12 and the Y-direction regulation portion 15. Thus, when the position of the mounting portion 30 to the landscape arrangement portion 10 is adjusted by the adjustment portion 40 described below, subsequent positional adjustment after changeover of arrangement of the X-ray detector 100 is unnecessary. This makes it possible to efficiently change over the arrangement of the X-ray detector 100 as compared with the existing technique.

In the case of the portrait orientation, the position of the mounting portion 30 in the X direction and the Z direction is regulated by abutment of the mounting member 31 and the XY-direction regulation portion 22, and the position of the mounting portion 30 in the Z direction is regulated by abutment of the mounting member 31 and the Z-direction regulation portion 25.

Figure 6A:
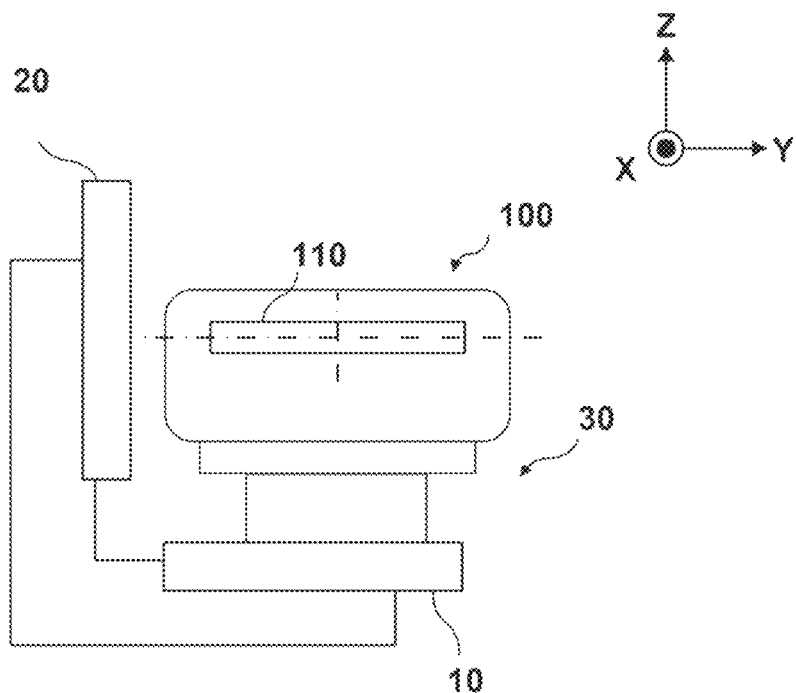
FIG. 6A is a diagram to explain a difference of an arrangement angle between landscape orientation and portrait orientation.
Figure 6B:
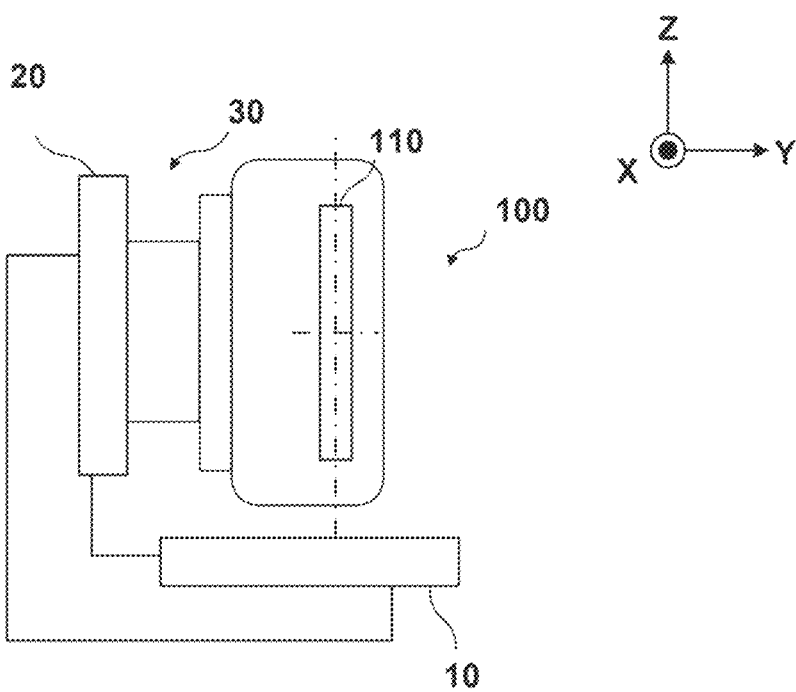
FIG. 6B is a diagram to explain the difference of the arrangement angle between the landscape orientation and the portrait orientation.

FIG. 6A and FIG. 6B are diagrams illustrating a difference of the arrangement angle between the case where the mounting portion 30 is mounted on the landscape arrangement portion 10 and the case where the mounting portion 30 is mounted on the portrait arrangement portion 20. In the present embodiment, the arrangement angle of the X-ray detector 100 fixed to the mounting portion 30 is different between the landscape orientation (FIG. 6A) in which the mounting portion 30 is mounted on the landscape arrangement portion 10 and the portrait orientation (FIG. 6B) in which the mounting portion 30 is mounted on the portrait arrangement portion 20. More specifically, in the present embodiment, the arrangement angle (tilt angle) around an X axis of the X-ray detector 100 fixed to the mounting portion 30 is different by 90 degrees between the portrait orientation and the landscape orientation. Accordingly, profiles of the different ranges can be acquired depending on the case of the landscape orientation of the X-ray detector 100 or the case of the portrait orientation of the X-ray detector 100.

Further, in the present embodiment, since the detector stand 1 includes the landscape arrangement portion 10 and the portrait arrangement portion 20, the X-ray detector 100 can be placed in the landscape orientation and in the portrait orientation by using only one detector stand 1. In contrast, for example, in a case where a stand for landscape orientation and a stand for portrait orientation are separately prepared, it is necessary to demount the stand from the goniometer every time the arrangement is changed over. Thus, it may take time to change over the arrangement. Further, when the stand is demounted from the goniometer, positioning with high accuracy may become necessary. On the other hand, in the present embodiment, changeover between the landscape orientation and the portrait orientation is performable in a state where the detector stand 1 itself is coupled to the goniometer, which makes it possible to facilitate changeover of the arrangement as compared with the existing technique.

In the present embodiment, the arrangement angle (tilt angle) around the X axis of the X-ray detector 100 fixed to the mounting portion 30 is different by 90 degrees between the landscape orientation and the portrait orientation: however, the difference of the arrangement angle is not limited to 90 degrees, and may be an angle within a predetermined range including 90 degrees. The predetermined range may be, for example, a range from 89 degrees to 91 degrees, a range from 88 degrees to 92 degrees, a range from 85 degrees to 95 degrees, or a range from 80 degrees to 100 degrees.

Figure 7A:
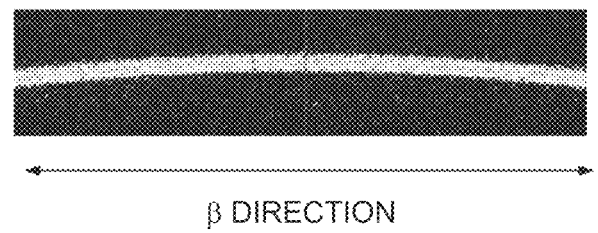
FIG. 7A is a diagram illustrating a detection region in the landscape orientation.
Figure 7B:
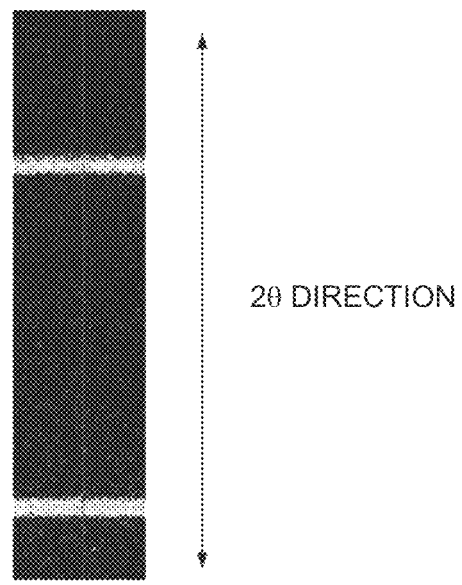
FIG. 7B is a diagram illustrating the detection region in the portrait orientation.

FIG. 7A is a diagram illustrating a detection region in the landscape orientation, and FIG. 7B is a diagram illustrating the detection region in the portrait orientation. In the case of the landscape orientation, a range wide in an in-plane direction (B direction) can be measured. In this case, the X-ray detector 100 can measure a diffraction image called a Debye ring within a range longer in a circumferential direction. Examples of measurement effectively performed in the landscape orientation include rocking curve measurement, and measurement for evaluation of an orientation state.

In contrast, in the case of the portrait orientation, a range wide in an out-plane direction (2θ direction) can be measured. In this case, a diffraction image that cannot be detected by measurement in the landscape orientation can be detected. Examples of measurement effectively performed in the portrait orientation include in-situ measurement (charge/discharge measurement, high-temperature measurement), and mapping measurement of a micro area that requires measurement in a short time.

As described above, the user can obtain more appropriate measurement result by selecting whether the measurement is performed in the landscape orientation or the portrait orientation based on a purpose of the measurement. Further, as described above, in the present embodiment, changeover between the landscape orientation and the portrait orientation is efficiently performable as compared with the existing technique, which enables the user to more efficiently obtain a more appropriate measurement result.

<Adjustment Portion>

Figure 8A:
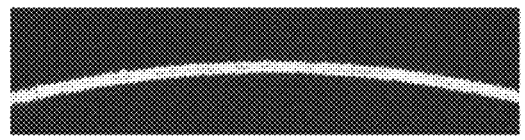
FIG. 8A is an explanatory diagram illustrating influence of positional displacement of an X-ray detector on a measurement result.
Figure 8B:
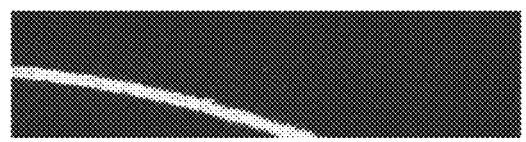
FIG. 8B is an explanatory diagram illustrating influence of positional displacement of the X-ray detector on a measurement result.
Figure 8C:
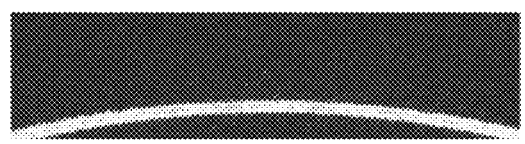
FIG. 8C is an explanatory diagram illustrating influence of positional displacement of the X-ray detector on a measurement result.
Figure 8D:
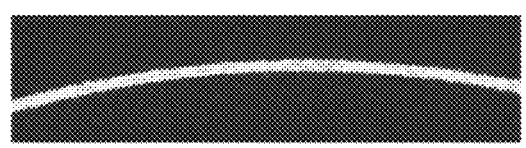
FIG. 8D is an explanatory diagram illustrating influence of positional displacement of the X-ray detector on a measurement result.

FIG. 8A to FIG. 8D are explanatory diagrams illustrating influence of positional displacement of the X-ray detector 100 on a measurement result. FIG. 8A illustrates a measurement result in a state where positional adjustment of the X-ray detector 100 is correctly performed. In the drawing, an arc-shaped diffraction image is illustrated, and a center of the diffraction image in a peripheral direction is positioned at a center of the detection region. On the other hand, in a case where the measurement is performed in a state where the X-ray detector 100 is shifted in the lateral direction, the diffraction image is shifted in the lateral direction (FIG. 8B). In a case where the measurement is performed in a state where the X-ray detector 100 is shifted in the longitudinal direction, the diffraction image is shifted in the longitudinal direction (downward direction in this example) (FIG. 8C). Further, in a case where the measurement is performed in a state where the X-ray detector 100 is shifted in a tilt direction, a 2θ angle is different between a left end and a right end of the detection surface (FIG. 8D).

As described above, when the measurement is performed in the state where the position of the X-ray detector 100 is shifted, a desired measurement result may not be obtained. Thus, in the present embodiment, the adjustment portion 40 performs positional adjustment in each of the landscape orientation and the portrait orientation.

Referring back to FIG. 1 to FIG. 4, the adjustment portion 40 can perform positional adjustment of three axes of the X-ray detector 100 in the landscape orientation and positional adjustment of three axes of the X-ray detector 100 in the portrait orientation. In the present embodiment, the adjustment portion 40 includes a landscape adjustment portion 41 and a portrait adjustment portion 42.

The landscape adjustment portion 41 adjusts arrangement of the X-ray detector 100 in the landscape orientation. The landscape adjustment portion 41 includes a Y-axis adjustment mechanism 41a, a Z-axis adjustment mechanism 41b, and an X-axis rotation adjustment mechanism 41c. The landscape adjustment portion 41 can adjust the three axes of the X-ray detector 100 in the landscape orientation by using these mechanisms.

The Y-axis adjustment mechanism 41a is a mechanism performing positional adjustment of the X-ray detector 100 in the horizontal direction (Y direction). The Y direction is a direction orthogonal to a detection direction (X direction) of the X-ray detector 100. The Z-axis adjustment mechanism 41b is a mechanism performing positional adjustment of the X-ray detector 100 in the vertical direction (Z direction). The Z direction is a direction orthogonal to the detection direction (X direction) of the X-ray detector 100 and the width direction (Y direction) of the X-ray detector 100.

As a specific structure of each of the Y-axis adjustment mechanism 41a and the Z-axis adjustment mechanism 41b, a known structure can be appropriately used. For example, the Y-axis adjustment mechanism 41a includes an unmovable part that cannot move, a movable part that can move in the Y direction relative to the unmovable part, and an adjustment part for adjusting a moving amount of the movable part, such as a screw: The Z-axis adjustment mechanism 41b includes an unmovable part that cannot move, a movable part that can move in the Z direction relative to the unmovable part, and an adjustment part for adjusting a moving amount of the movable part, such as a screw. More specifically, a positional adjustment mechanism of a rack and pinion type, a feed screw type such as a ball screw, a push screw type, or the other type can be used for each of the Y-axis adjustment mechanism 41a and the Z-axis adjustment mechanism 41b.

Note that relationship of the axis adjustable by the Y-axis adjustment mechanism 41a and the axis adjustable by the Z-axis adjustment mechanism 41b is not limited to the orthogonal relationship. In other words, it is sufficient to arrange the X-ray detector 100 at a desired position on the YZ plane by the Y-axis adjustment mechanism 41a and the Z-axis adjustment mechanism 41b, and an angle formed by the two axes may be an angle within a predetermined range. The predetermined range may be, for example, a range from 89 degrees to 91 degrees, a range from 88 degrees to 92 degrees, a range from 85 degrees to 95 degrees, or a range from 80 degrees to 100 degrees.

The X-axis rotation adjustment mechanism 41c is a mechanism performing angle adjustment around the axis extending in the detection direction (X direction) of the X-ray detector 100. The angle around the axis extending in the X direction is called a tilt angle in some cases. As a specific structure of the X-axis rotation adjustment mechanism 41c, a known technique can be appropriately used. For example, the X-axis rotation adjustment mechanism 41c includes an unmovable part that cannot move, a pivotable part that can pivot around the X axis relative to the unmovable part, and an adjustment part for adjusting a pivot amount of the pivotable part, such as a screw.

The portrait adjustment portion 42 adjusts arrangement of the X-ray detector 100 in the portrait orientation. The portrait adjustment portion 42 includes a Y-axis adjustment mechanism 42a and a Z-axis adjustment mechanism 42b.

The Y-axis adjustment mechanism 42a is a mechanism performing positional adjustment of the X-ray detector 100 in the horizontal direction (Y direction). The Z-axis adjustment mechanism 42b is a mechanism performing positional adjustment of the X-ray detector 100 in the vertical direction (Z direction). For example, the Y-axis adjustment mechanism 42a includes an unmovable part that cannot move, a movable part that can move in the Y direction relative to the unmovable part, and an adjustment part for adjusting a moving amount of the movable part, such as a screw. The Z-axis adjustment mechanism 42b includes an unmovable part that cannot move, a movable part that can move in the Z direction relative to the unmovable part, and an adjustment part for adjusting a moving amount of the movable part, such as a screw. More specifically, a positional adjustment mechanism of a rack and pinion type, a feed screw type such as a ball screw, a push screw type, or the other type can be used for each of the Y-axis adjustment mechanism 42a and the Z-axis adjustment mechanism 42b.

Note that relationship of the axis adjustable by the Y-axis adjustment mechanism 42a and the axis adjustable by the Z-axis adjustment mechanism 42b is not limited to the orthogonal relationship. In other words, it is sufficient to arrange the X-ray detector 100 at a desired position on the YZ plane by the Y-axis adjustment mechanism 42a and the Z-axis adjustment mechanism 42b, and an angle formed by the two axes may be an angle within a predetermined range. The predetermined range may be, for example, a range from 89 degrees to 91 degrees, a range from 88 degrees to 92 degrees, a range from 85 degrees to 95 degrees, or a range from 80 degrees to 100 degrees.

The arrangement positions of the mechanisms included in the adjustment portion 40 can be appropriately designed. In the present embodiment, among the mechanisms of the landscape adjustment portion 41, the Y-axis adjustment mechanism 41a is provided on the landscape arrangement portion 10 side, and the Z-axis adjustment mechanism 41b and the X-axis rotation adjustment mechanism 41c are provided on the mounting portion 30 side. Further, the Y-axis adjustment mechanism 42a and the Z-axis adjustment mechanism 42b of the portrait adjustment portion 42 are provided on the portrait arrangement portion 20 side.

In the present embodiment, the coupling portion 60 is provided below the landscape arrangement portion 10. Accordingly, providing some of the mechanisms of the landscape adjustment portion 41 on the mounting portion 30 side makes it possible to prevent interference with the goniometer on which the detector stand 1 is mounted.

On the other hand, because of the configuration in which the positional adjustment is performed in the state where the X-ray detector 100 is fixed to the mounting portion 30, a surface of the mounting portion 30 accessible by a tool during the adjustment is limited. Therefore, in the present embodiment, at least some of the adjustment mechanisms of the landscape adjustment portion 41 are provided on the landscape arrangement portion 10 side, and at least some of the adjustment mechanisms of the portrait adjustment portion 42 are provided on the portrait arrangement portion 20 side. This prevents deterioration of accessibility of the tool to the adjustment mechanisms.

Alternatively, all of the adjustment mechanisms of the landscape adjustment portion 41 may be provided on the landscape arrangement portion 10 side, and all of the adjustment mechanisms of the portrait adjustment portion 42 may be provided on the portrait arrangement portion 20 side. In this case, the structure of the mounting portion 30 side can be simplified. Note that, in this case, a mechanism for adjusting the tilt angle may be provided on the portrait adjustment portion 42.

Further alternatively, all of the adjustment mechanisms of one of the landscape adjustment portion 41 and the portrait adjustment portion 42 may be provided on the mounting portion 30 side, and all of the adjustment mechanisms of the other adjustment portion may be provided on the landscape arrangement portion 10 side or the portrait arrangement portion 20 side.

Figure 9A:
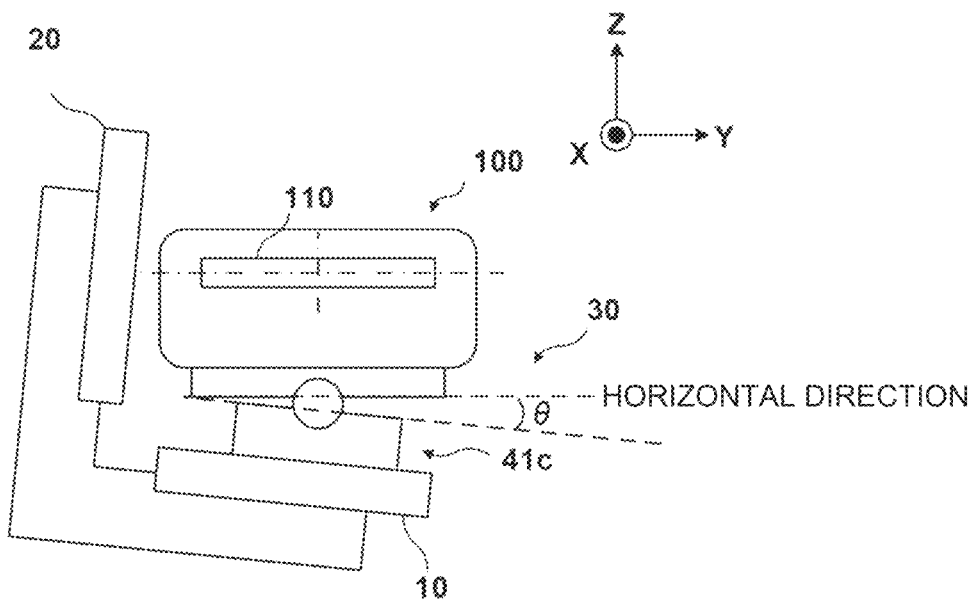
FIG. 9A is an explanatory diagram illustrating adjustment of a tilt angle.
Figure 9B:
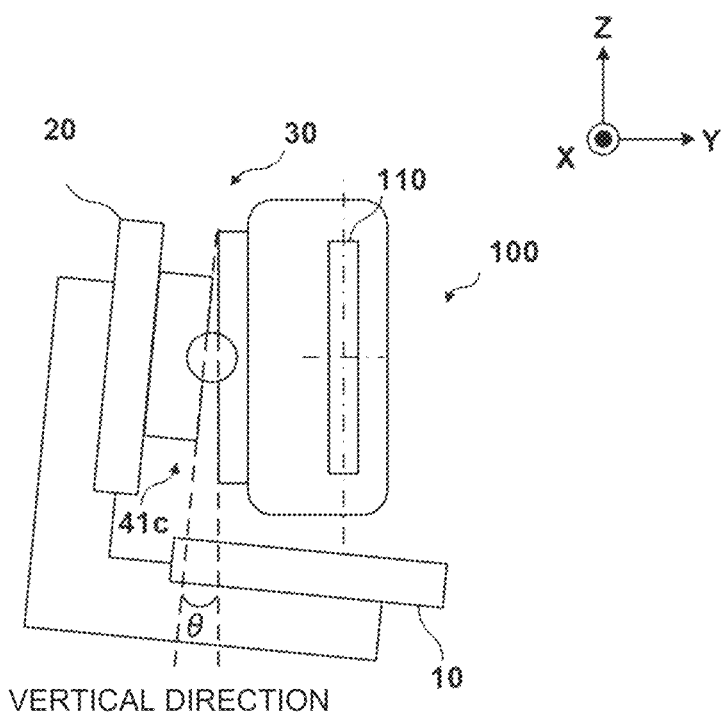
FIG. 9B is an explanatory diagram illustrating adjustment of the tilt angle.

In the present embodiment, a mechanism for adjusting the tilt angle is not provided on the portrait adjustment portion 42. In the following, adjustment of the tilt angle in the portrait orientation is described. FIG. 9A and FIG. 9B are explanatory diagrams illustrating adjustment of the tilt angle in the landscape orientation and the portrait orientation, respectively.

As illustrated in FIG. 9A, in a case where the arrangement surface 11 of the landscape arrangement portion 10 is installed while being inclined to the horizontal direction, adjustment by using the X-axis rotation adjustment mechanism 41c is performed such that the long-side direction of the detection surface 110 of the X-ray detector 100 becomes horizontal. At this time, in the present embodiment, the X-axis rotation adjustment mechanism 41c is provided on the mounting portion 30 side. Therefore, even in a case where the X-ray detector 100 is changed over from the landscape orientation to the portrait orientation, the angle (angle of fixing portion 32 to arrangement surfaces 11 and 21) adjusted by the X-axis rotation adjustment mechanism 41c is maintained. Further, in the present embodiment, the arrangement surface 11 and the arrangement surface 21 are provided so as to be orthogonal to each other. Accordingly, when the tilt angle is adjusted such that the long-side direction of the detection surface 110 becomes horizontal in the landscape orientation, the long-side direction of the detection surface 110 extends along the vertical direction in the portrait orientation (FIG. 9B). In other words, the adjustment of the tilt angle in the landscape orientation is also performed as the adjustment of the tilt angle in the portrait orientation. In a case where the tilt angle is adjusted in the portrait orientation first, the adjustment is also performed as the adjustment of the tilt angle in the landscape orientation.

As described above, the X-axis rotation adjustment mechanism 41c of the landscape adjustment portion 41 is provided on the mounting portion 30 side, and the arrangement surface 11 and the arrangement surface 21 are provided so as to be orthogonal to each other, which makes it possible to omit a tilt angle adjustment mechanism of the portrait adjustment portion 42. In this example, the landscape adjustment portion 41 includes the X-axis rotation adjustment mechanism 41c: however, it can be said that the X-axis rotation adjustment mechanism 41c also serves as the tilt angle adjustment mechanism of the landscape adjustment portion 41 and the tilt angle adjustment mechanism of the portrait adjustment portion 42. In other words, each of the landscape adjustment portion 41 and the portrait adjustment portion 42 can perform adjustment of three axes. The independent mechanisms can be used for adjustment of the two axes (translation in YZ direction), and the common mechanism can be used for adjustment of the tilt angle. In this example, the landscape adjustment portion 41 includes the X-axis rotation adjustment mechanism 41c; however, it can be said that the tilt angle adjustment mechanism of the X-ray detector 100 is provided separately from the landscape adjustment portion 41 and the portrait adjustment portion 42 that perform adjustment in the translation direction.

Further, in the present embodiment, the Y-axis adjustment mechanism 41a and the Z-axis adjustment mechanism 41b of the landscape adjustment portion 41 are provided on the landscape arrangement portion 10 side, and the Y-axis adjustment mechanism 42a and the Z-axis adjustment mechanism 42b of the portrait adjustment portion 42 are provided on the portrait arrangement portion 20 side. This makes it possible to independently maintain the positions after adjustment in the XZ direction in the portrait orientation and the landscape orientation. More specifically, since the Z-axis adjustment mechanism 41b is provided on the mounting portion 30 side, the positional adjustment in the portrait orientation can be performed using the Z-axis adjustment mechanism 41b in terms of the structure. However, when the positional adjustment in the portrait orientation is performed by the Z-axis adjustment mechanism 42b on the portrait arrangement portion 20 side, the positions after adjustment in the XZ direction in the portrait orientation and the landscape orientation can be independently maintained. Further, an aspect is not limited to the aspect of the present embodiment, and at least one of the Y-axis adjustment mechanism 41a and the Y-axis adjustment mechanism 42a and at least one of the Z-axis adjustment mechanism 41b and the Z-axis adjustment mechanism 42b are provided on the landscape arrangement portion 10 side or the portrait arrangement portion 20 side, which makes it possible to independently maintain the positions after adjustment in the XZ direction in the portrait orientation and the landscape orientation.

On the other hand, since the X-axis rotation adjustment mechanism 41c is provided on the mounting portion 30 side and the arrangement surface 11 and the arrangement surface 21 are provided so as to be orthogonal to each other, the desired tilt angle can be maintained in any of the landscape orientation and the portrait orientation. As a result, even when the arrangement is changed over, the positions after adjustment both in the landscape orientation and the portrait orientation can be maintained. In the present embodiment, the X-axis rotation adjustment mechanism 41c is provided on the mounting portion 30; however, the tilt angle adjustment mechanism that can adjust the tilt angle by simultaneously rotating the arrangement surface 11 and the arrangement surface 21 around the X axis may be provided. In other words, the tilt angle adjustment mechanism that can adjust the landscape arrangement portion 10 (arrangement surface 11) and the portrait arrangement portion 20 (arrangement surface 21) from the state illustrated in FIG. 9A to the state illustrated in FIG. 6A is adoptable.

Further, a configuration in which the tilt angle adjustment mechanism (X-axis rotation adjustment mechanism) for the landscape orientation and the tilt angle adjustment mechanism (X-axis rotation adjustment mechanism) for the portrait orientation are separately provided is adoptable. In this case, it is unnecessary to provide the arrangement surface 11 and the arrangement surface 21 with predetermined orthogonal accuracy. Therefore, as compared with the case where the tilt angle adjustment mechanism is shared by the landscape orientation and the portrait orientation, it is possible to increase a tolerance during manufacture. Further, when at least one of the tilt angle adjustment mechanism for the landscape orientation or the tilt angle adjustment mechanism for the portrait orientation is provided on the landscape arrangement portion 10 side or the portrait arrangement portion 20 side, it is possible to maintain the tilt angles after adjustment both in the landscape orientation and the portrait orientation.

The adjustment portion 40 may include a positional adjustment mechanism common to the portrait orientation and the landscape orientation in place of the landscape adjustment portion 41 and the portrait adjustment portion 42. In this case, fine adjustment of the arrangement by the adjustment portion 40 is necessary every time the arrangement is changed over. However, it is unnecessary to demount the stand from the goniometer every time the arrangement is changed over as described above. Therefore, it is possible to easily change over the arrangement also in this case as compared with the existing technique.

Other Embodiments

Figure 10A:
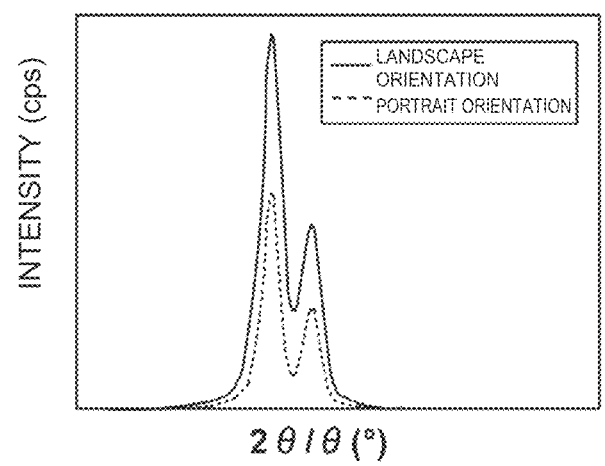
FIG. 10A is a diagram to explain a difference of a measurement result of one-dimensional measurement between the landscape orientation and the portrait orientation.
Figure 10B:
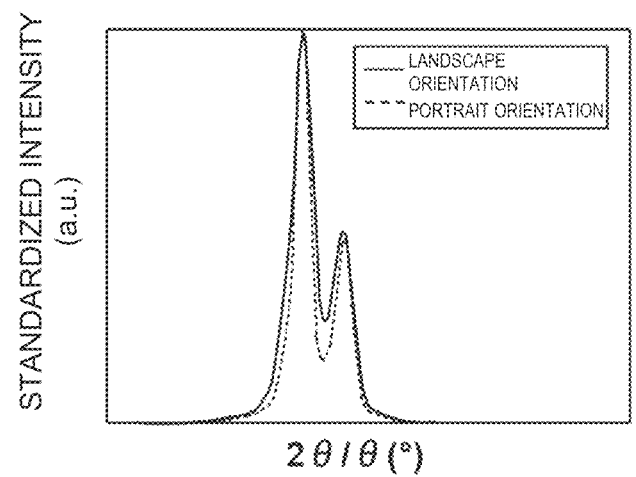
FIG. 10B is a diagram to explain the difference of the measurement result of the one-dimensional measurement between the landscape orientation and the portrait orientation.

FIG. 10A and FIG. 10B are diagrams to explain a difference of a measurement result of one-dimensional measurement between the landscape orientation and the portrait orientation. In a case of performing the one-dimensional measurement, measurement focusing on angular resolution can be performed in the landscape orientation, whereas measurement focusing on diffraction intensity can be performed in the portrait orientation.

<X-Ray Diffractometers>

Referring back to FIG. 1, according to an aspect of the present invention, an X-ray diffractometers 200 including the detector stand 1 according to the above-described embodiment and the X-ray detector 100 may be provided. The X-ray diffractometers 200 is an apparatus performing X-ray diffraction measurement. The X-ray diffractometers 200 may include an unillustrated goniometer and an X-ray generation apparatus. For example, the goniometer includes a sample stage that supports a sample and rotates. Further, the detector stand 1 can be coupled to the goniometer such that a distance between the sample on the sample stage and the X-ray detector 100 supported by the detector stand 1 is adjustable. When a rotation angle of the sample stage is controlled, the sample is irradiated with an X-ray generated from the X-ray generation apparatus at a predetermined angle. When a predetermined X-ray diffraction condition is satisfied between the X-ray applied to the sample and a crystal lattice plane in the sample, the X-ray is diffracted in the sample. The X-ray detector 100 detects the X-ray diffracted in the sample. For example, when the X-rays are irradiated to the crystal lattice plane of the sample at an angle θ, the diffraction angle of the X-ray is 2.

The above-described embodiment can be variously modified and changed without departing from the spirit or the scope of the present invention. Further, the features described in connection with one embodiment of the present invention can be used with other embodiments even if not explicitly described above.

The present application is based on and claims priority from Japanese Patent Application No. 2023-012826, filed Jan. 31, 2023, the disclosure of which is hereby incorporated by reference herein in its entirety.

What is claimed is:

1. A detector stand for an X-ray detector, comprising:
   a first arrangement portion configured to arrange the X-ray detector in first orientation;
   a second arrangement portion configured to arrange the X-ray detector in second orientation; and
   a mounting portion to which the X-ray detector can be fixed, wherein
   in the detector stand, the X-ray detector is selectively mountable on the first arrangement portion or the second arrangement portion through the mounting portion, and
   an arrangement angle of the X-ray detector fixed to the mounting portion is different between the first orientation and the second orientation.

2. The detector stand according to claim 1, wherein
   the first orientation is landscape orientation in which a width direction of the X-ray detector extends in a lateral direction, and
   the second orientation is portrait orientation in which the width direction of the X-ray detector extends in a longitudinal direction.

3. The detector stand according to claim 2, further comprising an adjustment portion configured to perform positional adjustment of three axes of the X-ray detector in the first orientation and positional arrangement of three axes of the X-ray detector in the second orientation.

4. The detector stand according to claim 2, further comprising:
   a first adjustment portion including a first Y-axis adjustment mechanism configured to adjust a position of the X-ray detector in a Y direction orthogonal to an X direction that is a detection direction of the X-ray detector in the first orientation, and a first Z-axis adjustment mechanism configured to adjust a position of the X-ray detector in a Z direction orthogonal to the X direction and the Y direction in the first orientation; and a second adjustment portion including a second Y-axis adjustment mechanism configured to adjust a position of the X-ray detector in the Y direction in the second orientation, and a second Z-axis adjustment mechanism configured to adjust a position of the X-ray detector in the Z direction in the second orientation.

5. The detector stand according to claim 4, further comprising an X-axis rotation adjustment mechanism configured to adjust an angle around an axis extending in the X direction of the X-ray detector, wherein
the arrangement angle of the X-ray detector fixed to the mounting portion in the first orientation is orthogonal to the arrangement angle of the X-ray detector fixed to the mounting portion in the second orientation.

6. The detector stand according to claim 4, wherein
the first adjustment portion includes a first X-axis rotation adjustment mechanism configured to adjust an angle around an axis extending in the X direction of the X-ray detector in the first orientation, and
the second adjustment portion includes a second X-axis rotation adjustment mechanism configured to adjust an angle around the axis extending in the X-direction of the X-ray detector in the second orientation.

7. The detector stand according to claim 5, wherein the first adjustment portion is provided on the mounting portion.

8. The detector stand according to claim 7, further comprising a coupling portion configured to be coupled to a goniometer to enable adjustment of a distance between the X-ray detector and a detection object.

9. The detector stand according to claim 8, wherein the coupling portion is provided below the first adjustment portion.

10. The detector stand according to claim 1, wherein each of the first arrangement portion and the second arrangement portion includes:
a regulation portion configured to regulate relative positions of the mounting portion and the corresponding arrangement portion; and
a holding portion configured to hold a position of the mounting portion in a state where the relative positions are regulated by the regulation portion.

11. The detector stand according to claim 10, wherein the holding portion includes an abutting portion configured to abut on the mounting portion, a moving mechanism configured to retractably move the abutting portion to the mounting portion, and a handle configured to operate the moving mechanism.

12. An X-ray diffractometers, comprising:
an X-ray detector; and
the detector stand according to claim 1.

13. The X-ray diffractometers according to claim 12, wherein an aspect ratio of a detection range of the X-ray detector is 2 or more.

* * * * *